US011029042B2

(12) United States Patent
Suzuki et al.

(10) Patent No.: US 11,029,042 B2
(45) Date of Patent: Jun. 8, 2021

(54) INDOOR UNIT FOR HEAT PUMP USE APPARATUS AND HEAT PUMP USE APPARATUS INCLUDING THE SAME

(71) Applicant: Mitsubishi Electric Corporation, Tokyo (JP)

(72) Inventors: Yasuhiro Suzuki, Tokyo (JP); Taro Hattori, Tokyo (JP); Hirokazu Minamisako, Tokyo (JP); Kazutaka Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 252 days.

(21) Appl. No.: 16/319,854

(22) PCT Filed: Oct. 17, 2016

(86) PCT No.: PCT/JP2016/080646
§ 371 (c)(1),
(2) Date: Jan. 23, 2019

(87) PCT Pub. No.: WO2018/073853
PCT Pub. Date: Apr. 26, 2018

(65) Prior Publication Data
US 2019/0264927 A1     Aug. 29, 2019

(51) Int. Cl.
*F24D 19/10*     (2006.01)
*F24D 11/02*     (2006.01)
(Continued)

(52) U.S. Cl.
CPC ...... *F24D 19/1072* (2013.01); *F24D 11/0228* (2013.01); *F24D 17/02* (2013.01);
(Continued)

(58) Field of Classification Search
CPC ............ F25B 2400/053; F25B 2400/16; F25B 2400/054; F25B 2400/121; F25B 47/025;
(Continued)

(56) References Cited

U.S. PATENT DOCUMENTS

2010/0326540 A1* 12/2010 Moretti ................... F17C 13/04
                                                                    137/468
2012/0018129 A1*  1/2012 Ushijima ................. F24D 3/18
                                                                    165/104.19
(Continued)

FOREIGN PATENT DOCUMENTS

JP      2006-207993 A     8/2006
JP      2010-242983 A     10/2010
(Continued)

OTHER PUBLICATIONS

Emerson, "Pressure Relief Valve Engineering Handbook", Aug. 27, 2018, http://www.emerson.com/documents/automation/pressure-relief-valve-engineering-handbook-en-us-3923290.pdf.*
(Continued)

*Primary Examiner* — Steven S Anderson, II
(74) *Attorney, Agent, or Firm* — Posz Law Group, PLC (57) ABSTRACT

Provided is an indoor unit for a heat pump use apparatus, the indoor unit being a part of the heat pump use apparatus including a refrigerant circuit configured to circulate refrigerant, a heat medium circuit configured to allow a heat medium to flow through the heat medium circuit, and a heat exchanger configured to exchange heat between the refrigerant and the heat medium. The indoor unit is connectable to an outdoor unit accommodating the refrigerant circuit and the heat exchanger. The indoor unit accommodates a part of the heat medium circuit. The indoor unit includes a pressure protection device connected to the heat medium circuit, and
(Continued)

an on-off device provided to be interposed between the heat medium circuit and the pressure protection device.

15 Claims, 5 Drawing Sheets

(51) Int. Cl.
    *F24D 17/02*     (2006.01)
    *F25B 30/02*     (2006.01)
    *F25B 47/02*     (2006.01)

(52) U.S. Cl.
    CPC ............ *F25B 30/02* (2013.01); *F25B 47/025* (2013.01); *F24D 2200/123* (2013.01); *F25B 2339/047* (2013.01); *F25B 2400/053* (2013.01); *F25B 2400/054* (2013.01); *F25B 2400/121* (2013.01); *F25B 2400/16* (2013.01); *Y02B 10/70* (2013.01)

(58) Field of Classification Search
    CPC ........... F24D 2200/123; F24D 11/0228; F24D 19/1072; F24D 17/02
    See application file for complete search history.

(56) References Cited

U.S. PATENT DOCUMENTS

2014/0208791 A1*   7/2014   Suzuki ...................... F24D 3/18
                                                                          62/324.6
2016/0109162 A1     4/2016   Suzuki et al.

FOREIGN PATENT DOCUMENTS

| JP | 2013-167398 A | 8/2013 |
|---|---|---|
| JP | 2013-217622 A | 10/2013 |
| JP | 2013-221706 A | 10/2013 |
| JP | 2015-055448 A | 3/2015 |

OTHER PUBLICATIONS

International Search Report of the International Searching Authority dated Jan. 10, 2017 for the corresponding international application No. PCT/JP2016/080646 (and English translation).

Extended European Search Report dated Sep. 19, 2018 issued in corresponding EP patent application No. 16903367.7.

\* cited by examiner

INDOOR UNIT FOR HEAT PUMP USE APPARATUS AND HEAT PUMP USE APPARATUS INCLUDING THE SAME

CROSS REFERENCE TO RELATED APPLICATION

This application is a U.S. national stage application of PCT/JP2016/080646 filed on Oct. 17, 2016, the contents of which are incorporated herein by reference.

TECHNICAL FIELD

The present invention relates to an indoor unit for a heat pump use apparatus, the indoor unit being a part of the heat pump use apparatus including a refrigerant circuit and a heat medium circuit, and to a heat pump use apparatus including the indoor unit.

BACKGROUND ART

In Patent Literature 1, there is described an outdoor unit for a heat pump cycle apparatus using flammable refrigerant. The outdoor unit includes a refrigerant circuit including a compressor, an air heat exchanger, an expansion device, and a water heat exchanger, which are connected to one another through pipes, and a pressure relief valve configured to prevent excessive rise of water pressure in a water circuit configured to supply water heated in the water heat exchanger. With this configuration, even when a partition wall partitioning the refrigerant circuit and the water circuit is broken in the water heat exchanger and the flammable refrigerant is mixed into the water circuit, the flammable refrigerant can be discharged to the outside through the pressure relief valve.

CITATION LIST

Patent Literature

Patent Literature 1: Japanese Unexamined Patent Application Publication No. 2013-167398

SUMMARY OF INVENTION

Technical Problem

In a heat pump use apparatus such as the heat pump cycle apparatus, in general, a pressure relief valve of the water circuit is provided in an indoor unit. There are various combinations of an outdoor unit and an indoor unit in the heat pump use apparatus. An outdoor unit and an indoor unit that are manufactured by the same manufacturer may be combined. Further, an outdoor unit and an indoor unit that are manufactured by different manufacturers may be combined. Consequently, the outdoor unit described in Patent Literature 1 may be combined with the indoor unit including the pressure relief valve.

However, in Patent Literature 1, when the flammable refrigerant is leaked to the water circuit, the flammable refrigerant mixed into water inside the water circuit may be discharged not only through the pressure relief valve provided in the outdoor unit, but also through the pressure relief valve provided in the indoor unit. Consequently, there is a problem in that a flammable concentration region may be generated in a room.

The present invention has been made to solve the problem described above, and has an object to provide an indoor unit for a heat pump use apparatus, the indoor unit being configured to prevent a flammable concentration region in a room from being generated, and a heat pump use apparatus including the indoor unit.

Solution to Problem

According to one embodiment of the present invention, there is provided an indoor unit for a heat pump use apparatus, the indoor unit being a part of the heat pump use apparatus including a refrigerant circuit configured to circulate refrigerant, a heat medium circuit configured to allow a heat medium to flow through the heat medium circuit, and a heat exchanger configured to exchange heat between the refrigerant and the heat medium. The indoor unit is connectable to an outdoor unit accommodating the refrigerant circuit and the heat exchanger. The indoor unit accommodates a part of the heat medium circuit. The indoor unit includes a pressure protection device connected to the heat medium circuit, and an on-off device provided to be interposed between the heat medium circuit and the pressure protection device.

According to one embodiment of the present invention, there is provided a heat pump use apparatus including the outdoor unit and the indoor unit for a heat pump use apparatus of one embodiment of the present invention.

Advantageous Effects of Invention

According to one embodiment of the present invention, even when the refrigerant is leaked to the heat medium circuit, with the on-off device, the refrigerant mixed into the heat medium can be prevented from being discharged to a room from the pressure protection device. Consequently, even when the indoor unit is connected to the outdoor unit using flammable refrigerant as the refrigerant, the generation of the flammable concentration region in the room can be prevented.

DESCRIPTION OF EMBODIMENTS

Embodiment 1

Figure 1:
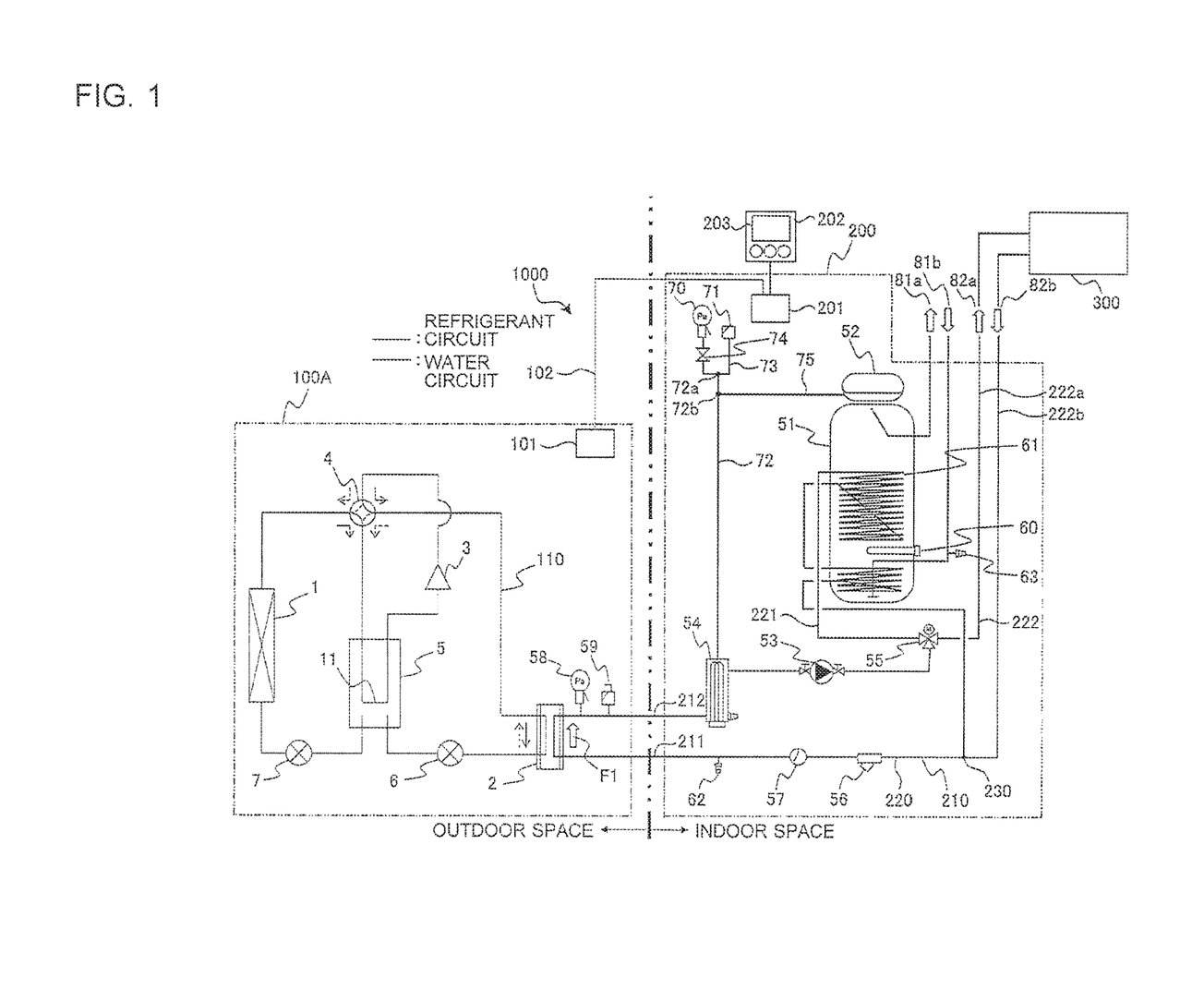
FIG. 1 is a circuit diagram for illustrating a schematic configuration of a heat pump use apparatus according to Embodiment 1 of the present invention.

An indoor unit for a heat pump use apparatus and a heat pump use apparatus including the indoor unit according to Embodiment 1 of the present invention are described. FIG.

1 is a circuit diagram for illustrating a schematic configuration of the heat pump use apparatus according to Embodiment 1. In Embodiment 1, a heat pump water heater 1000 is exemplified as the heat pump use apparatus. Further, in Embodiment 1, the heat pump water heater 1000 including an outdoor unit 100A using flammable refrigerant as refrigerant and an indoor unit 200 in combination is exemplified. In the drawings including FIG. 1 referred to below, a dimensional relationship of components and a shape of each of the components may be different from those of actual components.

As illustrated in FIG. 1, the heat pump water heater 1000 includes a refrigerant circuit 110 configured to circulate refrigerant and a water circuit 210 configured to allow water to flow through the water circuit 210. Further, the heat pump water heater 1000 includes the outdoor unit 100A installed outside, for example, in outdoor space, and the indoor unit 200 installed in indoor space. The indoor unit 200 is installed, for example, in a kitchen, a bathroom, or a laundry room, or, further, in a storage space such as a closet inside a building.

The refrigerant circuit 110 includes a compressor 3, a refrigerant flow switching device 4, a load-side heat exchanger 2, a first pressure reducing device 6, an intermediate pressure receiver 5, a second pressure reducing device 7, and a heat source-side heat exchanger 1 that are annularly connected in order through refrigerant pipes. Through use of the refrigerant circuit 110, the heat pump water heater 1000 is capable of a normal operation, for example, heater water heating operation, for heating water flowing through the water circuit 210 and a defrosting operation for circulating the refrigerant reversely to the normal operation to defrost the heat source-side heat exchanger 1.

The compressor 3 is a fluid machine configured to compress sucked low-pressure refrigerant and to discharge the refrigerant as high-pressure refrigerant. The compressor 3 of Embodiment 1 includes an inverter device, and is configured to change a driving frequency freely selectively, to thereby be able to change a capacity, that is, an amount of the refrigerant to be sent per unit time.

The refrigerant flow switching device 4 is configured to switch a flow direction of the refrigerant inside the refrigerant circuit 110 between the normal operation and the defrosting operation. As the refrigerant flow switching device 4, for example, a four-way valve is used.

The load-side heat exchanger 2 is a water heat exchanger configured to exchange heat between the refrigerant flowing through the refrigerant circuit 110 and the water flowing through the water circuit 210. As the load-side heat exchanger 2, for example, a plate heat exchanger is used. The load-side heat exchanger 2 includes a refrigerant flow passage for allowing refrigerant to flow through the refrigerant flow passage as a part of the refrigerant circuit 110, a water flow passage for allowing water to flow through the water flow passage as a part of the water circuit 210, and a thin plate-like partition wall partitioning the refrigerant flow passage and the water flow passage. The load-side heat exchanger 2 acts as a condenser (radiator) configured to heat water during the normal operation, and acts as an evaporator (heat absorber) during the defrosting operation.

The first pressure reducing device 6 is configured to adjust a flow rate of refrigerant, for example, to adjust a pressure of the refrigerant flowing into the load-side heat exchanger 2. The intermediate pressure receiver 5 is located between the first pressure reducing device 6 and the second pressure reducing device 7 in the refrigerant circuit 110, and is configured to accumulate an excess of the refrigerant. A suction pipe 11 connected to a suction side of the compressor 3 passes through the inside of the intermediate pressure receiver 5. In the intermediate pressure receiver 5, heat is exchanged between the refrigerant passing through the suction pipe 11 and the refrigerant inside the intermediate pressure receiver 5. Consequently, the intermediate pressure receiver 5 has a function as an internal heat exchanger in the refrigerant circuit 110. The second pressure reducing device 7 is configured to adjust the pressure of the refrigerant by adjusting the flow rate of the refrigerant. The first pressure reducing device 6 and the second pressure reducing device 7 of Embodiment 1 are each an electronic expansion valve capable of changing an opening degree in accordance with an instruction from a controller 101 described later.

The heat source-side heat exchanger 1 is an air heat exchanger configured to exchange heat between the refrigerant flowing through the refrigerant circuit 110 and outside air sent by an outdoor air-sending fan or other devices (not shown). The heat source-side heat exchanger 1 acts as an evaporator (heat absorber) during the normal operation, and acts as a condenser (radiator) during the defrosting operation.

Examples of refrigerants used as the refrigerants to be circulated through the refrigerant circuit 110 include a slightly flammable refrigerant such as R1234yf and R1234ze (E) and a strongly flammable refrigerant such as R290 and R1270. Those refrigerants may be each used as a single component refrigerant, or may be used as a mixed refrigerant obtained by mixing two or more kinds of the refrigerants with each other. In the following description, the refrigerant having flammability equal to or higher than a slightly flammable level (for example, 2 L or higher in category of ASHRAE 34) may be referred to as "refrigerant having flammability" or "flammable refrigerant". Further, as described later, as the refrigerant to be circulated through the refrigerant circuit 110, a nonflammable refrigerant such as R4070 and R410A having nonflammability (for example, 1 in the category of ASHRAE 34) can be used. Those refrigerants have a density larger than that of air under an atmospheric pressure (for example, with a temperature being a room temperature (25 degrees Celsius)).

The outdoor unit 100A accommodates the refrigerant circuit 110 including the compressor 3, the refrigerant flow switching device 4, the load-side heat exchanger 2, the first pressure reducing device 6, the intermediate pressure receiver 5, the second pressure reducing device 7, and the heat source-side heat exchanger 1. That is, the outdoor unit 100A illustrated in FIG. 1 is an outdoor unit using flammable refrigerant as refrigerant.

Further, the outdoor unit 100A includes the controller 101 configured to mainly control an operation of the refrigerant circuit 110, for example, the compressor 3, the refrigerant flow switching device 4, the first pressure reducing device 6, the second pressure reducing device 7, and the outdoor air-sending fan (not shown). The controller 101 includes a microcomputer including a CPU, a ROM, a RAM, and an input-output port. The controller 101 can communicate with a controller 201 and an operation unit 202, which are described later, through a control line 102.

Next, an example of the operation of the refrigerant circuit 110 is described. In FIG. 1, the flow direction of the refrigerant in the refrigerant circuit 110 during the normal operation is indicated by solid arrows. The refrigerant circuit 110 is configured such that, during the normal operation, the refrigerant flow passage is switched by the refrigerant flow switching device 4 as indicated by the solid arrows to cause the high-temperature and high-pressure refrigerant to flow into the load-side heat exchanger 2.

The high-temperature and high-pressure gas refrigerant discharged from the compressor 3 passes through the refrigerant flow switching device 4, and flows into the refrigerant flow passage of the load-side heat exchanger 2. During the normal operation, the load-side heat exchanger 2 acts as a condenser. That is, in the load-side heat exchanger 2, heat is exchanged between the refrigerant flowing through the refrigerant flow passage and the water flowing through the water flow passage of the load-side heat exchanger 2, and the heat of condensation of the refrigerant is transferred to the water. With this operation, the refrigerant flowing through the refrigerant flow passage of the load-side heat exchanger 2 is condensed to become high-pressure liquid refrigerant. Further, the water flowing through the water flow passage of the load-side heat exchanger 2 is heated by the transferred heat from the refrigerant.

The high-pressure liquid refrigerant condensed by the load-side heat exchanger 2 flows into the first pressure reducing device 6, and has the pressure reduced slightly to become two-phase refrigerant. The two-phase refrigerant flows into the intermediate pressure receiver 5, and is cooled through the heat exchange with low-pressure gas refrigerant flowing through the suction pipe 11 to become liquid refrigerant. The liquid refrigerant flows into the second pressure reducing device 7, and has the pressure reduced to become low-pressure two-phase refrigerant. The low-pressure two-phase refrigerant flows into the heat source-side heat exchanger 1. During the normal operation, the heat source-side heat exchanger 1 acts as an evaporator. That is, in the heat source-side heat exchanger 1, heat is exchanged between the refrigerant circulated through the inside and the outside air sent by the outdoor air-sending fan, and the heat of evaporation of the refrigerant is received from the outside air. With this operation, the refrigerant that has flowed into the heat source-side heat exchanger 1 evaporates to become the low-pressure gas refrigerant. The low-pressure gas refrigerant passes through the refrigerant flow switching device 4, and flows into the suction pipe 11. The low-pressure gas refrigerant that has flowed into the suction pipe 11 is heated through the heat exchange with the refrigerant inside the intermediate pressure receiver 5, and is sucked by the compressor 3. The refrigerant sucked by the compressor 3 is compressed to become the high-temperature and high-pressure gas refrigerant. In the normal operation, the above-mentioned cycle is repeated.

Next, an example of the operation during the defrosting operation is described. In FIG. 1, the flow direction of the refrigerant in the refrigerant circuit 110 during the defrosting operation is indicated by the dashed arrows. The refrigerant circuit 110 is configured such that, during the defrosting operation, the refrigerant flow passage is switched by the refrigerant flow switching device 4 as indicated by dashed arrows to cause the high-temperature and high-pressure refrigerant to flow into the heat source-side heat exchanger 1.

The high-temperature and high-pressure gas refrigerant discharged from the compressor 3 passes through the refrigerant flow switching device 4, and flows into the heat source-side heat exchanger 1. During the defrosting operation, the heat source-side heat exchanger 1 acts as a condenser. That is, in the heat source-side heat exchanger 1, the heat of condensation of the refrigerant circulated through the inside is transferred to frost adhering to a surface of the heat source-side heat exchanger 1. With this operation, the refrigerant circulated through the inside of the heat source-side heat exchanger 1 is condensed to become the high-pressure liquid refrigerant. Further, the frost adhering to the surface of the heat source-side heat exchanger 1 is melted by the transferred heat from the refrigerant.

The high-pressure liquid refrigerant condensed by the heat source-side heat exchanger 1 passes through the second pressure reducing device 7, the intermediate pressure receiver 5, and the first pressure reducing device 6 to become the low-pressure two-phase refrigerant, and flows into the refrigerant flow passage of the load-side heat exchanger 2. The load-side heat exchanger 2 acts as an evaporator during the defrosting operation. That is, in the load-side heat exchanger 2, heat is exchanged between the refrigerant flowing through the refrigerant flow passage and the water flowing through the water flow passage, and heat of evaporation of the refrigerant is received from the water. With this operation, the refrigerant flowing through the refrigerant flow passage of the load-side heat exchanger 2 evaporates to become the low-pressure gas refrigerant. The gas refrigerant passes through the refrigerant flow switching device 4 and the suction pipe 11, and is sucked by the compressor 3. The refrigerant sucked by the compressor 3 is compressed to become the high-temperature and high-pressure gas refrigerant. In the defrosting operation, the above-mentioned cycle is continuously repeated.

Next, the water circuit 210 is described. The water circuit 210 of Embodiment 1 is a closed circuit configured to circulate water, and is constructed by a water circuit on the outdoor unit 100A side and a water circuit on the indoor unit 200 side, which are connected to each other. The water circuit 210 includes a main circuit 220 and a plurality of branch circuits 221 and 222. The main circuit 220 constructs a part of the closed circuit. The branch circuits 221 and 222 are each connected to the main circuit 220 to be branched from the main circuit 220. The branch circuits 221 and 222 are provided in parallel to each other. The branch circuit 221 constructs a part of the closed circuit together with the main circuit 220. The branch circuit 222 constructs a part of the closed circuit together with the main circuit 220 and a heater 300 connected to the branch circuit 222.

In Embodiment 1, water is an example of a heat medium circulated through the water circuit 210. However, as the heat medium, other liquid heat media such as brine may be used.

The main circuit 220 includes a strainer 56, a flow switch 57, the load-side heat exchanger 2, a pressure relief valve 58, an air purge valve 59, a booster heater 54, and a pump 53, which are connected to one another through water pipes. A drain outlet 62 configured to drain water inside the water circuit 210 is formed in a halfway part of the water pipes that construct the main circuit 220. A downstream end of the main circuit 220 is connected to an inflow port of a three-way valve 55 having the one inflow port and two outflow ports. An upstream end of the main circuit 220 is connected to a branching portion 230.

The pump 53 is a device configured to apply pressure to the water inside the water circuit 210 to circulate the water through the inside of the water circuit 210. The booster heater 54 is a device configured to further heat the water inside the water circuit 210 when, for example, the outdoor unit 100A has insufficient heating capacity. The three-way valve 55 is a device configured to cause the water inside the water circuit 210 to branch off. For example, the three-way valve 55 switches a flow of the water inside the main circuit 220 to be circulated between the branch circuit 221 side and the branch circuit 222 side. The strainer 56 is a device removing scale inside the water circuit 210. The flow switch 57 is a device configured to detect whether or not the flow rate of the water circulated through the inside of the water circuit 210 is equal to or larger than a fixed flow rate.

A pressure relief valve 70 and an air purge valve 71 are connected to the booster heater 54. The pressure relief valve 70 is an example of a pressure protection device, and the air purge valve 71 is an example of an air purge device. When the pressure relief valve 70 and the air purge valve 71 are connected to the branch circuits 221 and 222, the pressure relief valve 70 and the air purge valve 71 need to be provided for each of the individual branch circuits 221 and 222. In Embodiment 1, the pressure relief valve 70 and the air purge valve 71 are connected to the main circuit 220. Consequently, it is only necessary that one pressure relief valve 70 and one air purge valve 71 are provided. In particular, in the main circuit 220, the water temperature becomes the highest in the booster heater 54. Consequently, the booster heater 54 is suitable as a portion to which the pressure relief valve 70 is connected. Further, the booster heater 54 has a certain volume, and hence gas separated from the water is liable to accumulate in the booster heater 54. Consequently, the booster heater 54 is suitable also as a portion to which the air purge valve 71 is connected. The pressure relief valve 70 and the air purge valve 71 are provided in the indoor unit 200.

The pressure relief valve 70 is a protection device configured to prevent excessive rise of the pressure, caused by temperature change of water, in the water circuit 210. When the pressure in the water circuit 210 is increased to exceed a pressure control range of an expansion tank 52 described later, the pressure relief valve 70 is opened, and the water inside the water circuit 210 is released to the outside through the pressure relief valve 70.

The air purge valve 71 is a device configured to release, to the outside, gas mixed into the water circuit 210 at a time of installation of the heat pump water heater 1000 or gas separated from the water inside the water circuit 210 at a time of a trial run of the heat pump water heater 1000, and to prevent idle running of the pump 53. As the air purge valve 71, there is used, for example, an automatic air purge valve of a float type that has the structure closable through a manual operation. Here, the description "closable" means that a discharge port of the valve can be closed with a cap, a nut, or other members, or that a valve body such as a float can be fixed. The air purge valve 71 is almost unnecessary after the heat pump water heater 1000 is installed and the trial run is completed. Consequently, after the heat pump water heater 1000 is given over from an installation work company to a user, the air purge valve 71 is closed through a manual operation. When the air purge valve 71 is closed, the gas inside the water circuit 210 is not discharged through the air purge valve 71.

One end of a pipe 72, which is a water flow passage branched from the main circuit 220, is connected to a casing of the booster heater 54. The pressure relief valve 70 is mounted to the other end of the pipe 72. A branching portion 72a is provided at a halfway portion of the pipe 72. One end of a pipe 73 is connected to the branching portion 72a. The air purge valve 71 is mounted to the other end of the pipe 73.

An on-off valve 74 is provided on the pipe 72 at a portion between the branching portion 72a and the pressure relief valve 70. That is, the on-off valve 74 is provided on an entrance side of the pressure relief valve 70 (side opposite to the discharge port). The on-off valve 74 is an example of an on-off device. The on-off valve 74 is a two-way valve, which is openable and closable. As the on-off valve 74, there is used, for example, an electromagnetic valve configured to be opened and closed through control of the controller 201 described later. When flammable refrigerant is used in the outdoor unit 100A combined with the indoor unit 200 as in Embodiment 1, the on-off valve 74 is set to a closed state through the control of the controller 201. Meanwhile, when nonflammable refrigerant is used in the outdoor unit, the on-off valve 74 is set to an opened state through the control of the controller 201.

As the on-off valve 74, there may be used a manual valve configured to be opened and closed through a manual operation. In the setting guideline in the installation manual of the indoor unit 200, a case is described where the on-off valve 74 is the manual valve, when the indoor unit 200 is combined with the outdoor unit 100A using flammable refrigerant, the on-off valve 74 needs to be set to the closed state, and when the indoor unit 200 is combined with the outdoor unit using nonflammable refrigerant, the on-off valve 74 needs to be set to the opened state.

A branching portion 72b is provided on the pipe 72 at a portion between the booster heater 54 and the branching portion 72a. One end of a pipe 75 is connected to the branching portion 72b. The expansion tank 52 is connected to the other end of the pipe 75. That is, the expansion tank 52 is connected to the booster heater 54 through the pipes 75 and 72. The expansion tank 52 is a device configured to control the pressure change, caused by temperature change of water, inside the water circuit 210 within a predetermined range.

In Embodiment 1, the pressure relief valve 58 is provided in the outdoor unit 100A in addition to the pressure relief valve 70 provided in the indoor unit 200. The pressure relief valve 58 in the outdoor unit 100A is provided on the main circuit 220 of the outdoor unit 100A downstream of the load-side heat exchanger 2 in a flow direction of water inside the main circuit 220 (the arrow F1 in FIG. 1). The pressure relief valve 58 is a protection device configured to prevent excessive rise of the pressure inside the water circuit 210, and has the structure similar to that of the pressure relief valve 70. When the pressure in the water circuit 210 is increased to exceed the pressure control range of the expansion tank 52, the water inside the water circuit 210 is released to the outside through the pressure relief valve 58. The pressure relief valve 58 is provided, for example, outside a casing of the outdoor unit 100A.

Further, in Embodiment 1, the air purge valve 59 is provided in the outdoor unit 100A in addition to the air purge valve 71 provided in the indoor unit 200. The air purge valve 59 in the outdoor unit 100A is provided on the main circuit 220 of the outdoor unit 100A downstream of the load-side heat exchanger 2 in the flow direction of water inside the main circuit 220. In Embodiment 1, the air purge valve 59 is provided further downstream of the pressure relief valve 58 in the flow direction of water inside the main circuit 220. The air purge valve 59 is a device configured to release, to the outside, gas generated in the water circuit 210 and the gas mixed into the water circuit 210, and to prevent the idle running of the pump 53. As the air purge valve 59, there is used, for example, an automatic air purge valve of a float type. The air purge valve 59 is configured not to be closed, for example by a manual operation. That is, the air purge valve 59 in the outdoor unit 100A can always be operated unlike the air purge valve 71 in the indoor unit 200. The air purge valve 59 is provided, for example, outside the casing of the outdoor unit 100A.

The branch circuit 221 is provided in the indoor unit 200. An upstream end of the branch circuit 221 is connected to one outflow port of the three-way valve 55. A downstream end of the branch circuit 221 is connected to the branching portion 230. A coil 61 is provided in the branch circuit 221. The coil 61 is built in a hot-water storage tank 51 configured to store water in the hot-water storage tank 51. The coil 61 is a heating unit configured to heat the water accumulated in the hot-water storage tank 51 through heat exchange with water (hot water) circulated through the branch circuit 221 of the water circuit 210. Further, the hot-water storage tank 51 includes an immersion heater 60 built in the hot-water storage tank 51. The immersion heater 60 is a heating unit configured to further heat the water accumulated in the hot-water storage tank 51.

A sanitary circuit-side pipe 81*a* (for example, a hot water pipe) connected to, for example, a shower, is connected to an upper portion inside the hot-water storage tank 51. A sanitary circuit-side pipe 81*b* (for example, a makeup water pipe) is connected to a lower portion inside the hot-water storage tank 51. A drain outlet 63 is formed also in the sanitary circuit-side pipe 81*b*. In this case, to prevent decrease in temperature of the water inside the hot-water storage tank 51 due to heat transfer to the outside, the hot-water storage tank 51 is covered with a heat insulating material (not shown). Examples of the heat insulating material to be used include felt, Thinsulate (trademark), and a vacuum insulation panel (VIP).

The branch circuit 222 is provided in the indoor unit 200. The branch circuit 222 includes a supply pipe 222*a* and a return pipe 222*b*. An upstream end of the supply pipe 222*a* is connected to the other outflow port of the three-way valve 55. A downstream end of the return pipe 222*b* is connected to the branching portion 230. A downstream end of the supply pipe 222*a* and an upstream end of the return pipe 222*b* are respectively connected to heater circuit-side pipes 82*a* and 82*b* to which the heater 300 such as a radiator and a floor heater provided outside is connected.

Of the units of the main circuit 220, the load-side heat exchanger 2, the pressure relief valve 58, and the air purge valve 59 are provided in the outdoor unit 100A. Of the units of the main circuit 220, units other than the load-side heat exchanger 2, the pressure relief valve 58, and the air purge valve 59 are provided in the indoor unit 200. That is, the main circuit 220 of the water circuit 210 is provided across the outdoor unit 100A and the indoor unit 200. A part of the main circuit 220 is provided in the outdoor unit 100A, and another part of the main circuit 220 is provided in the indoor unit 200. The outdoor unit 100A and the indoor unit 200 are connected through two connecting pipes 211 and 212, which are parts of the water pipes.

The indoor unit 200 includes the controller 201 configured to mainly control an operation of the water circuit 210, for example, the pump 53, the booster heater 54, the three-way valve 55, and the on-off valve 74. The controller 201 includes a microcomputer including a CPU, a ROM, a RAM, and an input-output port. The controller 201 can communicate with the controller 101 and an operation unit 202.

For example, the controller 201 acquires information from the controller 101 in the outdoor unit 100A, and opens or closes the on-off valve 74 on the basis of the acquired information. The information to be acquired is information of a name of refrigerant or information of flammability of refrigerant. The information of flammability of refrigerant includes information indicating whether refrigerant is flammable or nonflammable and information of a flammability class of refrigerant (for example, 1, 2 L, 2, or 3 in the category of ASHRAE 34). The controller 201 sets the on-off valve 74 to the closed state when the controller 201 determines that flammable refrigerant is used in the outdoor unit 100A on the basis of the information acquired from the controller 101, and sets the on-off valve 74 to the opened state when the controller 201 determines that nonflammable refrigerant is used in the outdoor unit.

Further, the controller 201 may acquire information indicating whether or not the outdoor unit 100A includes the pressure relief valve 58 from the controller 101, and may open or close the on-off valve 74 on the basis of the acquired information. For example, the controller 201 sets the on-off valve 74 to the closed state when the controller 201 determines that the outdoor unit 100A includes the pressure relief valve 58 on the basis of the acquired information, and sets the on-off valve 74 to the opened state when the controller 201 cannot determine that the outdoor unit 100A includes the pressure relief valve 58 (also when the controller 201 determines that the outdoor unit 100A does not include the pressure relief valve 58).

The operation unit 202 allows a user to conduct the operation or various settings of the heat pump water heater 1000. The operation unit 202 of Embodiment 1 includes a display unit 203. The display unit 203 can display various kinds of information such as a state of the heat pump water heater 1000. The operation unit 202 is provided, for example, on the casing of the indoor unit 200.

Next, description is made of an operation in a case where the partition wall partitioning the refrigerant flow passage and the water flow passage in the load-side heat exchanger 2 is broken. The load-side heat exchanger 2 acts as an evaporator during the defrosting operation. Consequently, the partition wall of the load-side heat exchanger 2 may be broken due to freezing of water or other causes particularly during the defrosting operation. In general, the pressure of the refrigerant flowing through the refrigerant flow passage of the load-side heat exchanger 2 is higher than the pressure of the water flowing through the water flow passage of the load-side heat exchanger 2 both during the normal operation and during the defrosting operation. Consequently, when the partition wall of the load-side heat exchanger 2 is broken, the refrigerant in the refrigerant flow passage flows out to the water flow passage both during the normal operation and during the defrosting operation, and the refrigerant is mixed into the water inside the water flow passage. At this time, the refrigerant mixed into the water is gasified due to pressure decrease. Further, the refrigerant having the pressure higher than that of the water is mixed into the water, with the result that the pressure in the water flow passage is increased.

In the case where the outdoor unit 100A includes the pressure relief valve 58 as in Embodiment 1, when the pressure in the water circuit 210 is increased due to the mixing of the refrigerant, the refrigerant mixed into the water is released to the atmosphere in the outside space together with the water by the pressure relief valve 58. Further, when the outdoor unit 100A includes the air purge valve 59 as in Embodiment 1, the refrigerant in a gas state mixed into the water is released to the atmosphere in the outside space by the air purge valve 59. That is, each of the pressure relief valve 58 and the air purge valve 59 acts as a valve configured to release the refrigerant mixed into the water inside the water circuit 210 to the outside.

Note that, the refrigerant mixed into the water inside the water circuit 210 may be discharged not only by the pressure relief valve 58 and the air purge valve 59 provided in the outdoor unit 100A but also by the pressure relief valve 70 and the air purge valve 71 provided in the indoor unit 200. In this case, when the refrigerant has flammability as in Embodiment 1, a flammable concentration region may be generated in a room due to the refrigerant discharged to the room.

However, in the configuration of the indoor unit 200 according to Embodiment 1, the on-off valve 74 is provided to be interposed between the water circuit 210 and the pressure relief valve 70. Consequently, through setting of the on-off valve 74 to the closed state, the refrigerant can be prevented from being discharged to the room through the pressure relief valve 70. Further, in the configuration of Embodiment 1, the air purge valve 71 has the closable structure. Consequently, the refrigerant can be prevented from being discharged to the room through the air purge valve 71.

Figure 2:
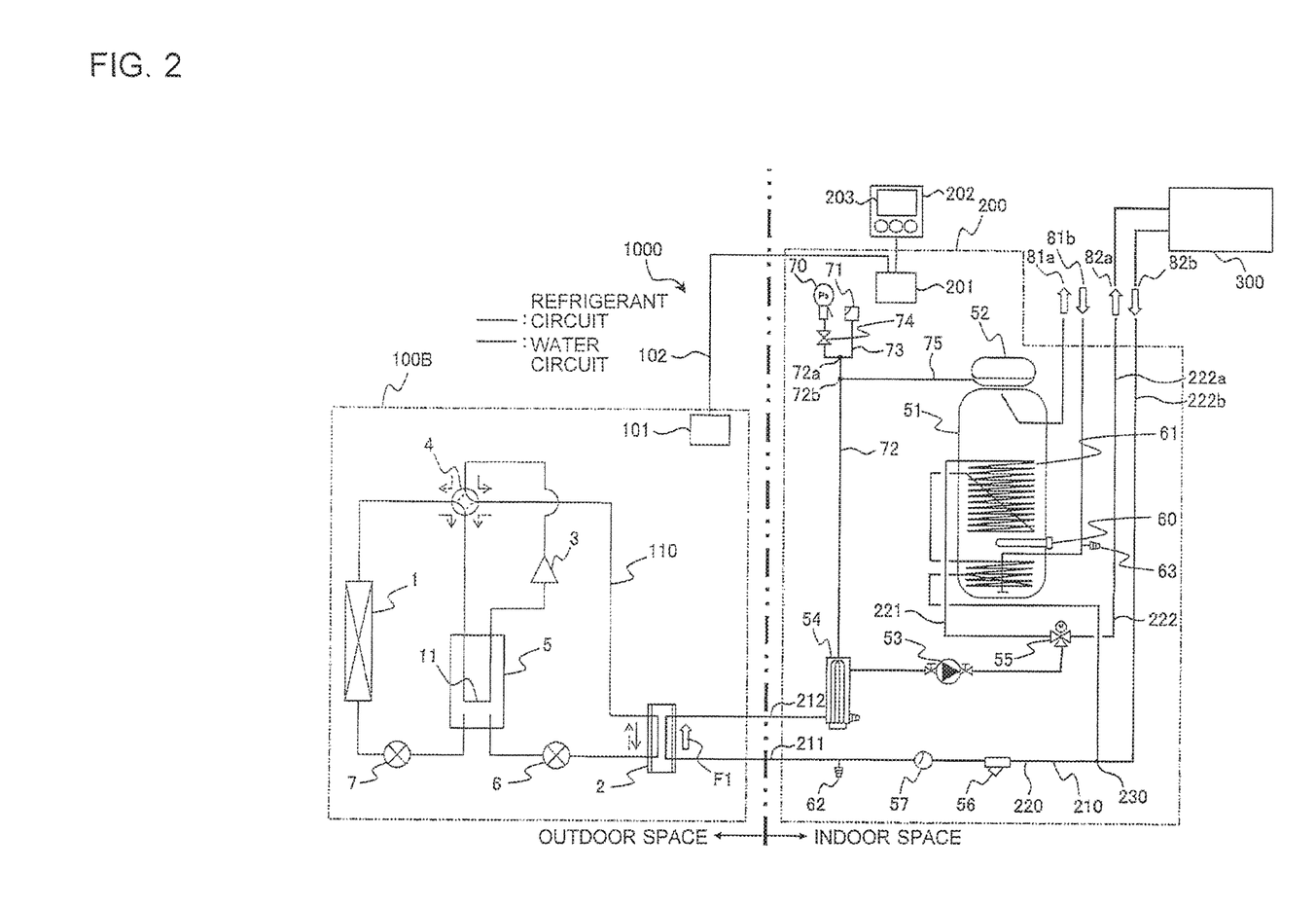
FIG. 2 is a circuit diagram for illustrating a schematic configuration of a heat pump use apparatus according to a modification example of Embodiment 1 of the present invention.

FIG. 2 is a circuit diagram for illustrating a schematic configuration of a heat pump use apparatus according to a modification example of Embodiment 1 of the present invention. In the modification example, a heat pump water heater 1000 including an outdoor unit 100E using nonflammable refrigerant as refrigerant and the indoor unit 200 similar to that of FIG. 1 in combination is exemplified. The outdoor unit 100E illustrated in FIG. 2 is different from the outdoor unit 100A illustrated in FIG. 1 in that nonflammable refrigerant is used, and that the pressure relief valve 58 and the air purge valve 59 are not provided.

As illustrated in FIG. 2, in the case of the outdoor unit 100B using nonflammable refrigerant, normally, the pressure relief valve 58 and the air purge valve 59 are not provided. However, in the indoor unit 200 according to Embodiment 1, through the setting of the on-off valve 74 to the opened state, the pressure relief valve 70 can be caused to function. Further, in the indoor unit 200 according to Embodiment 1, through setting of the air purge valve 71 not to be closed as necessary, the air purge valve 71 can be caused to function. Consequently, the indoor unit 200 according to Embodiment 1 can also be connected to the outdoor unit 100E using nonflammable refrigerant and not including the pressure relief valve 58 and the air purge valve 59.

As described above, the indoor unit 200 for a heat pump use apparatus according to Embodiment 1 constructs a part of the heat pump use apparatus including the refrigerant circuit 110 configured to circulate refrigerant, the water circuit 210 (example of a heat medium circuit) configured to allow water (example of a heat medium) to flow through the water circuit 210, and the load-side heat exchanger 2 (example of a heat exchanger) configured to exchange heat between refrigerant and water. The indoor unit 200 is connected to the outdoor unit 100A or 100B accommodating the refrigerant circuit 110 and the load-side heat exchanger 2. The indoor unit 200 accommodates a part of the water circuit 210. The indoor unit 200 includes the pressure relief valve 70 (example of a pressure protection device) connected to the water circuit 210, and the on-off valve 74 (example of an on-off device) provided to be interposed between the water circuit 210 and the pressure relief valve 70.

In Embodiment 1, the on-off valve 74 is provided to be interposed between the water circuit 210 and the pressure relief valve 70. Consequently, even when refrigerant is leaked to the water circuit 210, through the setting of the on-off valve 74 to the closed state, the refrigerant mixed into the water can be prevented from being discharged to a room through the pressure relief valve 70. Consequently, even when the indoor unit 200 according to Embodiment 1 is connected to the outdoor unit 100A using flammable refrigerant as refrigerant, the generation of the flammable concentration region in the room can be prevented.

Further, in Embodiment 1, through the setting of the on-off valve 74 to the opened state, the pressure relief valve 70 can be caused to function. Consequently, the indoor unit 200 according to Embodiment 1 can also be connected to the outdoor unit 100B using nonflammable refrigerant and not including the pressure relief valve.

That is, the indoor unit 200 of Embodiment 1 is versatilely applicable to both in the combination with the outdoor unit 100A using flammable refrigerant and including the pressure relief valve 58 (see FIG. 1) and the combination with the outdoor unit 100E using nonflammable refrigerant and not including the pressure relief valve 58 (see FIG. 2). Advantageously, a user does not have to confirm whether or not the combination of the indoor unit and an outdoor unit is available when the user is to purchase the heat pump water heater 1000. The indoor unit can be formed as versatilely applicable apparatus. Advantageously, a manufacturer does not have to prepare an indoor unit each dedicated to be combined with a corresponding one of the outdoor units 100A and 100B. Thus, cumbersome inventory control can be eliminated, that is, manufacture management costs can be reduced.

Further, in the indoor unit 200 for a heat pump use apparatus according to Embodiment 1, the water circuit 210 may include the main circuit 220, and the plurality of branch circuits 221 and 222 connected to the main circuit 220 to be branched from the main circuit 220. The pressure relief valve 70 may be connected to the main circuit 220.

Further, in the indoor unit 200 for a heat pump use apparatus according to Embodiment 1, the main circuit 220 may include the booster heater 54. The pressure relief valve 70 may be connected to the booster heater 54.

Further, in the indoor unit 200 for a heat pump use apparatus according to Embodiment 1, the pipe 72 for connecting the on-off valve 74 and the main circuit 220 (for example, the booster heater 54) to each other may include the branching portion 72b (example of a first branching portion). The expansion tank 52 may be connected to the branching portion 72b.

Further, the indoor unit 200 for a heat pump use apparatus according to Embodiment 1 may further include the air purge valve 71 (example of an air purge device) that is closable and is connected to the water circuit 210. The air purge valve 71 has the closable structure. Thus, even when refrigerant is leaked to the water circuit 210, the refrigerant mixed into the water can be prevented from being discharged to a room through the air purge valve 71. Further, through the setting of the air purge valve 71 not to be closed as necessary, the air purge valve 71 can be caused to function.

Further, in the indoor unit 200 for a heat pump use apparatus according to Embodiment 1, the water circuit 210 may include the main circuit 220, and the plurality of branch circuits 221 and 222 connected to the main circuit 220 to be branched from the main circuit 220. The air purge valve 71 may be connected to the main circuit 220.

Further, in the indoor unit 200 for a heat pump use apparatus according to Embodiment 1, the main circuit 220 may include the booster heater 54. The air purge valve 71 may be connected to the booster heater 54.

Further, in the indoor unit 200 for a heat pump use apparatus according to Embodiment 1, the pipe 72 for connecting the on-off valve 74 and the water circuit 210 to each other may include the branching portion 72a (example of a third branching portion). The air purge valve 71 may be connected to the branching portion 72a.

Further the indoor unit 200 for a heat pump use apparatus according to Embodiment 1 may further include the controller 201 (example of the controller) configured to control the on-off valve 74. The controller 201 may be configured to open and close the on-off valve 74 on the basis of the information acquired from the outdoor unit 100A or 100B.

Further, in the indoor unit 200 for a heat pump use apparatus according to Embodiment 1, the above-mentioned information may be any one of information of a name of the refrigerant, information of flammability of the refrigerant, information indicating whether or not the outdoor unit 100A or 100E includes the pressure relief valve 58 connected to the water circuit 210, information indicating whether or not the outdoor unit 100A or 100E includes the air purge valve 59 connected to the water circuit 210, and information indicating whether or not the outdoor unit 100A or 100B includes the pressure relief valve 58 and the air purge valve 59, which are connected to the water circuit 210.

Further, in the indoor unit 200 for a heat pump use apparatus according to Embodiment 1, when the controller 201 determines that the refrigerant is flammable refrigerant, the controller 201 may set the on-off valve 74 to the closed state.

Further, in the indoor unit 200 for a heat pump use apparatus according to Embodiment 1, when the controller 201 determines that the refrigerant is nonflammable refrigerant, the controller 201 may set the on-off valve 74 to the opened state.

Further, in the indoor unit 200 for a heat pump use apparatus according to Embodiment 1, when the controller 201 determines that the outdoor unit includes the pressure relief valve 58 connected to the water circuit 210, the controller 201 may set the on-off valve 74 to the closed state.

Further, in the indoor unit 200 for a heat pump use apparatus according to Embodiment 1, when the controller 201 cannot determine that the outdoor unit includes the pressure relief valve 58 connected to the water circuit 210, the controller 201 may set the on-off valve 74 to the opened state.

Further, in the indoor unit 200 for a heat pump use apparatus according to Embodiment 1, when the controller 201 determines that the outdoor unit includes the air purge valve 59 connected to the water circuit 210, the controller 201 may set the on-off valve 74 to the closed state.

Further, in the indoor unit 200 for a heat pump use apparatus according to Embodiment 1, when the controller 201 may not determine that the outdoor unit includes the air purge valve 59 connected to the water circuit 210, the controller 201 may set the on-off valve 74 to the opened state.

Further, the heat pump use apparatus according to Embodiment 1 (for example, the heat pump water heater 1000) includes the indoor unit 200 and the outdoor unit 100A or the outdoor unit 100B.

Further, in the heat pump use apparatus according to Embodiment 1, the outdoor unit 100A may include at least one of the pressure relief valve 58 and the air purge valve 59, which is connected to the water circuit 210.

Embodiment 2

Figure 3:
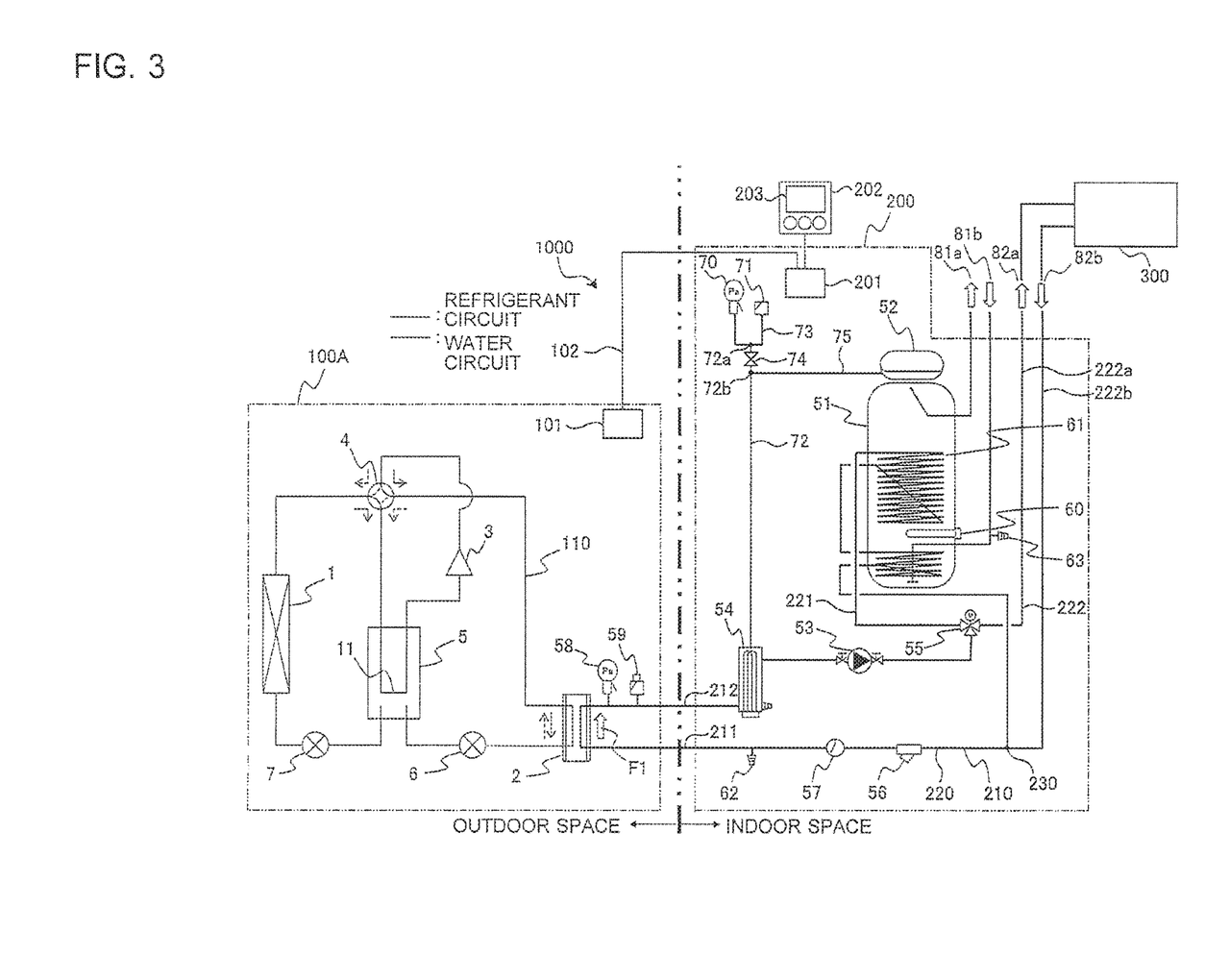
FIG. 3 is a circuit diagram for illustrating a schematic configuration of a heat pump use apparatus according to Embodiment 2 of the present invention.

An indoor unit for a heat pump use apparatus and a heat pump use apparatus including the indoor unit according to Embodiment 2 of the present invention are described. FIG. 3 is a circuit diagram for illustrating a schematic configuration of the heat pump use apparatus according to Embodiment 2. In Embodiment 2, a heat pump water heater 1000 is exemplified as the heat pump use apparatus. Components having the same functions and actions as those of Embodiment 1 are denoted by the same reference signs, and description of the components is omitted.

As illustrated in FIG. 3, in an indoor unit 200 according to Embodiment 2, the branching portion 72a for branching the pipe 72 and the pipe 73 is provided between the pressure relief valve 70 and the on-off valve 74. The on-off valve 74 is provided between the branching portion 72a and the branching portion 72b. That is, the on-off valve 74 is interposed between the water circuit 210 and the pressure relief valve 70, and is also interposed between the water circuit 210 and the air purge valve 71. Also according to Embodiment 2, effects similar to those of Embodiment 1 are obtained.

The controller 201 is configured to acquire information from the controller 101 in the outdoor unit (for example, the outdoor unit 100A or the outdoor unit 100B) connected to the indoor unit 200, and to open and close the on-off valve 74 on the basis of the acquired information. The information to be acquired is information of a name of refrigerant, information of flammability of refrigerant, information indicating whether or not the outdoor unit includes the pressure relief valve 58, information indicating whether or not the outdoor unit includes the air purge valve 59, information indicating whether or not the outdoor unit includes the pressure relief valve 58 and the air purge valve 59, or other information.

For example, when the controller 201 determines that the outdoor unit includes the air purge valve 59 on the basis of the acquired information, the controller 201 sets the on-off valve 74 to the closed state. When the controller 201 cannot determine that the outdoor unit includes the air purge valve 59, the controller 201 sets the on-off valve 74 to the opened state.

Further, for example, when the controller 201 determines that the outdoor unit includes the pressure relief valve 58 and the air purge valve 59 on the basis of the acquired information, the controller 201 sets the on-off valve 74 to the closed state. When the controller 201 cannot determine that the outdoor unit includes the pressure relief valve 58 and the air purge valve 59, the controller 201 sets the on-off valve 74 to the opened state.

As described above, in the indoor unit 200 for a heat pump use apparatus according to Embodiment 2, the pipe 72 for connecting the pressure relief valve 70 and the on-off valve 74 to each other may include the branching portion 72a (example of a second branching portion). The air purge valve 71 may be connected to the branching portion 72a.

Further, the indoor unit 200 for a heat pump use apparatus according to Embodiment 2 may further include the controller 201 (example of the controller) configured to control the on-off valve 74. The controller 201 may be configured to open and close the on-off valve 74 on the basis of the information acquired from the outdoor unit 100A or 100B.

Further, in the indoor unit 200 for a heat pump use apparatus according to Embodiment 2, the above-mentioned information may be any one of information of a name of the refrigerant, information of flammability of the refrigerant, information indicating whether or not the outdoor unit 100A or 100B includes the pressure relief valve 58 connected to the water circuit 210, information indicating whether or not the outdoor unit 100A or 100E includes the air purge valve 59 connected to the water circuit 210, and information indicating whether or not the outdoor unit 100A or 100B includes the pressure relief valve 58 and the air purge valve 59, which are connected to the water circuit 210.

Embodiment 3

Figure 4:
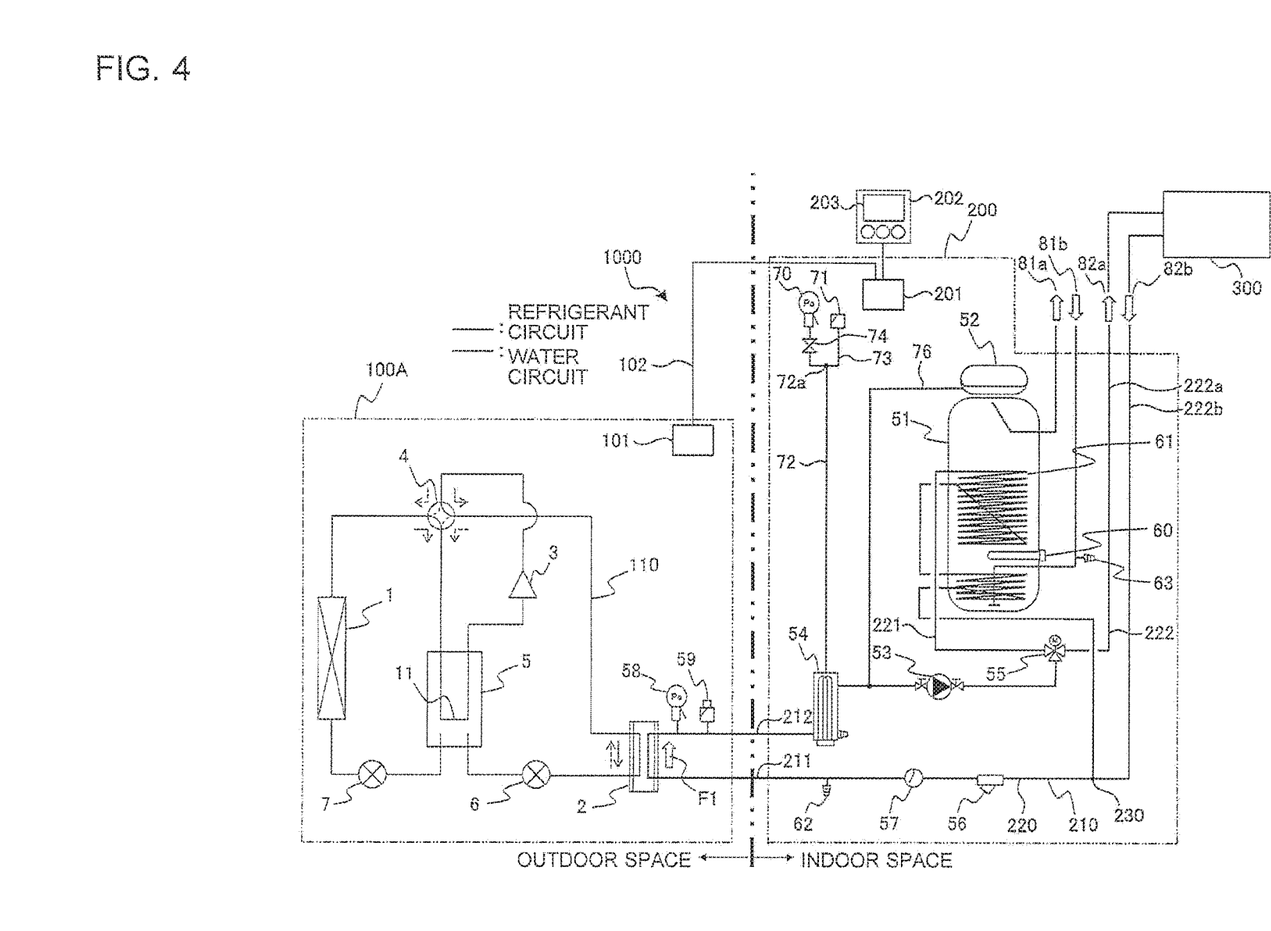
FIG. 4 is a circuit diagram for illustrating a schematic configuration of a heat pump use apparatus according to Embodiment 3 of the present invention.

An indoor unit for a heat pump use apparatus and a heat pump use apparatus including the indoor unit according to Embodiment 3 of the present invention are described. FIG. 4 is a circuit diagram for illustrating a schematic configuration of the heat pump use apparatus according to Embodiment 3. In Embodiment 3, a heat pump water heater 1000 is exemplified as the heat pump use apparatus. Components having the same functions and actions as those of Embodiment 1 are denoted by the same reference signs, and description of the components is omitted.

As illustrated in FIG. 4, in the indoor unit 200 according to Embodiment 3, the pressure relief valve 70 and the air purge valve 71 are connected to the booster heater 54 through the pipe 72 as in Embodiment 1. However, the expansion tank 52 is connected to the main circuit 220 through a pipe 76 instead of the pipe 72. The expansion tank 52 of Embodiment 3 is connected to a portion in the main circuit 220 other than the booster heater 54 (for example, a branching portion provided downstream of the booster heater 54 and upstream of the pump 53).

The on-off valve 74 is provided on the pipe 72 at a portion between the branching portion 72a and the pressure relief valve 70. The on-off valve 74 may be provided on the pipe 72 at a portion between the booster heater 54 and the branching portion 72a. Also according to Embodiment 3, effects similar to those of Embodiment 1 are obtained.

Embodiment 4

Figure 5:
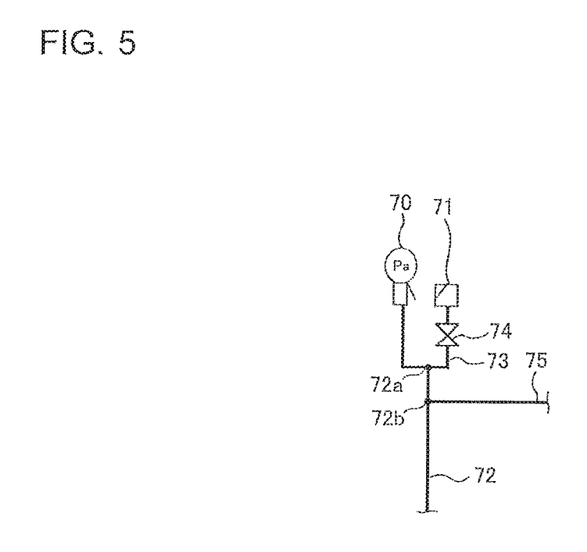
FIG. 5 is a circuit diagram for illustrating a part of a configuration of an indoor unit for a heat pump use apparatus according to Embodiment 4 of the present invention.

An indoor unit for a heat pump use apparatus and a heat pump use apparatus including the indoor unit according to Embodiment 4 of the present invention are described. FIG. 5 is a circuit diagram for illustrating a part of a configuration of the indoor unit 200 for a heat pump use apparatus according to Embodiment 4. A configuration of the heat pump use apparatus other than the part illustrated in FIG. 5 is the same as that of Embodiment 1.

As illustrated in FIG. 5, in Embodiment 4, the on-off valve 74 is provided on the pipe 73 at a portion between the branching portion 72a and the air purge valve 71. That is, the on-off valve 74 is provided to be interposed between the air purge valve 71 and the main circuit 220 of the water circuit 210. Similarly to the on-off valve 74 of Embodiment 1, the on-off valve 74 is, for example, controlled to be set to the closed state when flammable refrigerant is used in the outdoor unit, and controlled to be set to the opened state when nonflammable refrigerant is used in the outdoor unit. Further, a manual valve may be used as the on-off valve 74 as in Embodiment 1.

As described above, the indoor unit 200 for a heat pump use apparatus according to Embodiment 4 constructs a part of the heat pump use apparatus including the refrigerant circuit 110 configured to circulate refrigerant, the water circuit 210 (example of a heat medium circuit) configured to allow water (example of a heat medium) to flow through the water circuit 210, and the load-side heat exchanger 2 (example of a heat exchanger) configured to exchange heat between refrigerant and water. The indoor unit 200 is connected to the outdoor unit 100A or 100E accommodating the refrigerant circuit 110 and the load-side heat exchanger 2. The indoor unit 200 accommodates a part of the water circuit 210. The indoor unit 200 includes the air purge valve 71 (example of an air purge device) connected to the water circuit 210, and the on-off valve 74 (example of an on-off device) provided to be interposed between the water circuit 210 and the air purge valve 71.

In the above-mentioned configuration, even when refrigerant is leaked to the water circuit 210, through the setting of the on-off valve 74 to the closed state, the refrigerant mixed into the water can be prevented from being discharged to a room through the air purge valve 71. Consequently, even when the indoor unit 200 according to Embodiment 4 is connected to the outdoor unit 100A using flammable refrigerant as refrigerant, the generation of the flammable concentration region in the room can be prevented.

Further, in Embodiment 4, through the setting of the on-off valve 74 to the opened state, the air purge valve 71 can be caused to function. Consequently, the indoor unit 200 according to Embodiment 4 can also be connected to the outdoor unit 100E using nonflammable refrigerant and not including the air purge valve.

The present invention is not limited to the above-mentioned embodiments, and various modifications may be made to the embodiments.

For example, in the above-mentioned embodiments, the plate heat exchanger is given as an example of the load-side heat exchanger 2. However, the load-side heat exchanger 2 may be a heat exchanger other than the plate heat exchanger, such as a double-pipe heat exchanger as long as the heat exchanger is configured to exchange heat between refrigerant and a heat medium.

Further, in the above-mentioned embodiments, the heat pump water heater 1000 is given as an example of the heat pump use apparatus. However, the present invention is also applicable to other heat pump use apparatus, such as a chiller.

Further, in the above-mentioned embodiments, the indoor unit 200 including the hot-water storage tank 51 is given as an example. However, the hot-water storage tank may be provided separately from the indoor unit 200.

Further, the embodiments described above and the modification may be implemented in combinations.

REFERENCE SIGNS LIST 1 heat source-side heat exchanger 2 load-side heat exchanger 3 compressor 4 refrigerant flow switching device 5 intermediate pressure receiver 6 first pressure reducing device 7 second pressure reducing device 11 suction pipe 51 hot-water storage tank 52 expansion tank 53 pump 54 booster heater 55 three-way valve 56 strainer 57 flow switch 58 pressure relief valve 59 air purge valve 60 immersion heater 61 coil 62, 63 drain outlet 70 pressure relief valve 71 air purge valve 72 pipe 72a, 72b branching portion 73 pipe 74 on-off valve 75, 76 pipe 81a, 81b sanitary circuit-side pipe 82a, 82b heater circuit-side pipe 100A, 100B outdoor unit 101 controller 102 control line 110 refrigerant circuit 200 indoor unit 201 controller 202 operation unit 203 display unit 210 water circuit 211, 212 connecting pipe 220 main circuit 221, 222 branch circuit 222a supply pipe 222b return pipe 230 branching portion 300 heater 1000 heat pump water heater

The invention claimed is:

1. An indoor unit for a heat pump use apparatus, the indoor unit being a part of the heat pump use apparatus comprising a refrigerant circuit configured to circulate refrigerant, a heat medium circuit configured to allow a heat medium to flow through the heat medium circuit, and a heat exchanger configured to exchange heat between the refrigerant and the heat medium, the indoor unit being connectable to an outdoor unit accommodating the refrigerant circuit and the heat exchanger, the indoor unit accommodating a part of the heat medium circuit, the indoor unit comprising:
a pressure protection device connected to the heat medium circuit;
an on-off device provided to be interposed between the heat medium circuit and the pressure protection device; and
a controller configured to control the on-off device,
the controller being configured to open and close the on-off device on a basis of information acquired from the outdoor unit.

2. The indoor unit for a heat pump use apparatus of claim 1,
wherein the heat medium circuit includes a main circuit and a plurality of branch circuits connected to the main circuit to be branched from the main circuit, and
wherein the pressure protection device is connected to the main circuit.

3. The indoor unit for a heat pump use apparatus of claim 2, further comprising:
a first branching portion provided on a pipe for connecting the on-off device and the main circuit to each other; and
an expansion tank connected to the first branching portion.

4. An indoor unit for a heat pump use apparatus, the indoor unit being a part of the heat pump use apparatus comprising a refrigerant circuit configured to circulate refrigerant, a heat medium circuit configured to allow a heat medium to flow through the heat medium circuit, and a heat exchanger configured to exchange heat between the refrigerant and the heat medium, the indoor unit being connectable to an outdoor unit accommodating the refrigerant circuit and the heat exchanger, the indoor unit accommodating a part of the heat medium circuit, the indoor unit comprising:
an air purge device connected to the heat medium circuit;
an on-off device provided to be interposed between the heat medium circuit and the air purge device; and
the controller being configured to open and close the on-off device on a basis of information acquired from the outdoor unit.

5. The indoor unit for a heat pump use apparatus of claim 1, wherein the information comprises any one of information of a name of the refrigerant, information of flammability of the refrigerant, information indicating whether or not the outdoor unit includes a pressure protection device connected to the heat medium circuit, information indicating whether or not the outdoor unit includes an air purge device connected to the heat medium circuit, and information indicating whether or not the outdoor unit includes the pressure protection device and the air purge device that are connected to the heat medium circuit.

6. The indoor unit for a heat pump use apparatus of claim 1, wherein, when the controller determines that the refrigerant is flammable refrigerant, the controller is configured to set the on-off device to a closed state.

7. The indoor unit for a heat pump use apparatus of claim 1, wherein, when the controller determines that the refrigerant is nonflammable refrigerant, the controller is configured to set the on-off device to an opened state.

8. The indoor unit for a heat pump use apparatus of claim 1, wherein, when the controller determines that the outdoor unit includes the pressure protection device connected to the heat medium circuit, the controller is configured to set the on-off device to a closed state.

9. The indoor unit for a heat pump use apparatus of claim 1, wherein, when the controller is unable to determine that the outdoor unit includes the pressure protection device connected to the heat medium circuit, the controller is configured to set the on-off device to an opened state.

10. The indoor unit for a heat pump use apparatus of claim 1, wherein, when the controller determines that the outdoor unit includes the air purge device connected to the heat medium circuit, the controller is configured to set the on-off device to a closed state.

11. The indoor unit for a heat pump use apparatus of claim 1, wherein, when the controller is unable to determine that the outdoor unit includes the air purge device connected to the heat medium circuit, the controller is configured to set the on-off device to an opened state.

12. A heat pump use apparatus, comprising:
the indoor unit for a heat pump use apparatus of claim 1; and
the outdoor unit.

13. The heat pump use apparatus of claim 12, wherein the outdoor unit includes at least one of the pressure protection device and the air purge device that is connected to the heat medium circuit.

14. The indoor unit for a heat pump use apparatus of claim 4, wherein the heat medium circuit includes a main circuit and a plurality of branch circuits each connected to the main circuit to be branched from the main circuit, and
the air purge device is connected to the main circuit.

15. A heat pump use apparatus, comprising:
the indoor unit for a heat pump of claim 4; and
the outdoor unit.

* * * * *